INVENTOR.
JOHN N. DEW
WILLIAM L. MARTIN
BY
ATTORNEY

INVENTOR.
JOHN N. DEW
WILLIAM L. MARTIN

United States Patent Office 3,054,448
Patented Sept. 18, 1962

3,054,448
COUNTERFLOW IN SITU COMBUSTION PROCESS
John N. Dew and William L. Martin, Ponca City, Okla., assignors to Continental Oil Company, Ponca City, Okla., a corporation of Delaware
Filed Apr. 17, 1958, Ser. No. 729,156
4 Claims. (Cl. 166—11)

This invention is concerned with thermal recovery of crude oil from stratigraphic formations and is more particularly directed to the production of oil by the use of counterflow in situ combustion in a series of juxtaposed oil bearing formations separated by vertical permeability barriers.

In situ combustion processes are generally known to the art and involve the injection of an oxygen containing gas into a reservoir through an input well to develop an air or oxygen containing gas sweep through the reservoir and to a production well, raising the temperature of the formation at the injection well to the ignition point by utilizing a heater at the injection face of the formation or by other suitable means, and propagating the resulting combustion front through the reservoir by continued gas injection. As the combustion front progresses outwardly from the injection well, formation waters and most of the oil immediately in advance of the combustion zone are vaporized and swept out into the reservoir by the resulting combustion gases. A portion of the oil which remains in liquid phase is also urged through the reservoir by the imposed gas drive. The oil which remains in front of the combustion front is a higher boiling fraction which, because of the high temperatures existing in this location, is altered to a coke-like material which remains in place and is utilized as fuel to propagate the combustion front. In order to maintain combustion we have found it necessary to inject oxygen at a sufficient rate to maintain a temperature in the combustion zone of at least 600° F.

It will be apparent that at this temperature, fractionation of the oil as well as vaporization of all interstitial water occurs. Since the temperature decreases rapidly immediately in front of the combustion front, fractional condensation of the oil and condensation of the water will occur a relatively short distance outwardly from the combustion front. There is thus a substantial increase in liquid saturations in a zone where the temperature and oil mobility are low. Consequently, excessive liquid saturation builds up and increased resistance to gas flow quickly develops. There is, in effect, a saturation by liquid of the channels through which gas flow has been maintained. The occurrence of these zones of high liquid saturation and low gas flow is generally referred to as the formation of "permeability blocks." The tendency of permeability blocks to develop during in situ combustion results in the necessity for increasing injection pressures in order to maintain sufficient flow rates through the combustion zone to permit combustion. Intermittent occurrence of permeability blocks thus constitutes a condition detracting markedly from the economy of oil production by in situ combustion methods.

It is further significant that although oil production rates may be increased by in situ combustion, any increases in production rates of recovery wells are almost entirely the result of the pressure effects of the imposed gas drive. Production rates are, nevertheless, very substantially dependent upon the permeability of the formation surrounding the production well and the viscosity of the oil in its vicinity. Furthermore, as is usually the case, the air or oxygen containing gas introduced into the injection well does not all leave the formation through the production well but may escape into other areas of the formation thus sweeping a portion of the oil which it is desired to produce into areas from which it cannot readily be recovered. As a result of these additional factors, conventional in situ combustion processes require substantially greater quantities of air per barrel of oil recovered than would be necessary in their absence.

It is therefore an object of our invention to substantially increase the economy of oil recovery by decreasing the quantities of air necessary to produce a formation by in situ combustion.

It is another object of our invention to decrease the viscosity of oil in the area around the production well, thus substantially increasing production rates and decreasing the cost of oil recovery.

We further desire to provide a method which will substantially decrease the time lapse between initiation of in situ combustion and subsequent recovery.

We also wish to furnish a method which increases the effective permeabilities of the producing zone to gas flow and thus diminishes the compressor horsepower required for air injection.

It is a further object of our invention to permit a decrease in the well pattern density without causing a decrease in production rates by decreasing the viscosity of the crude oil in the vicinity of the production well, by increasing the gas viscosity, oil volume, and gas volume in the producing strata near the production well, by eliminating permeability blocks and by causing directionalization of flow patterns between injection and producing walls.

These, as well as further objects, will be apparent from a consideration of the following description as related to the drawing in which.

Figure 1:
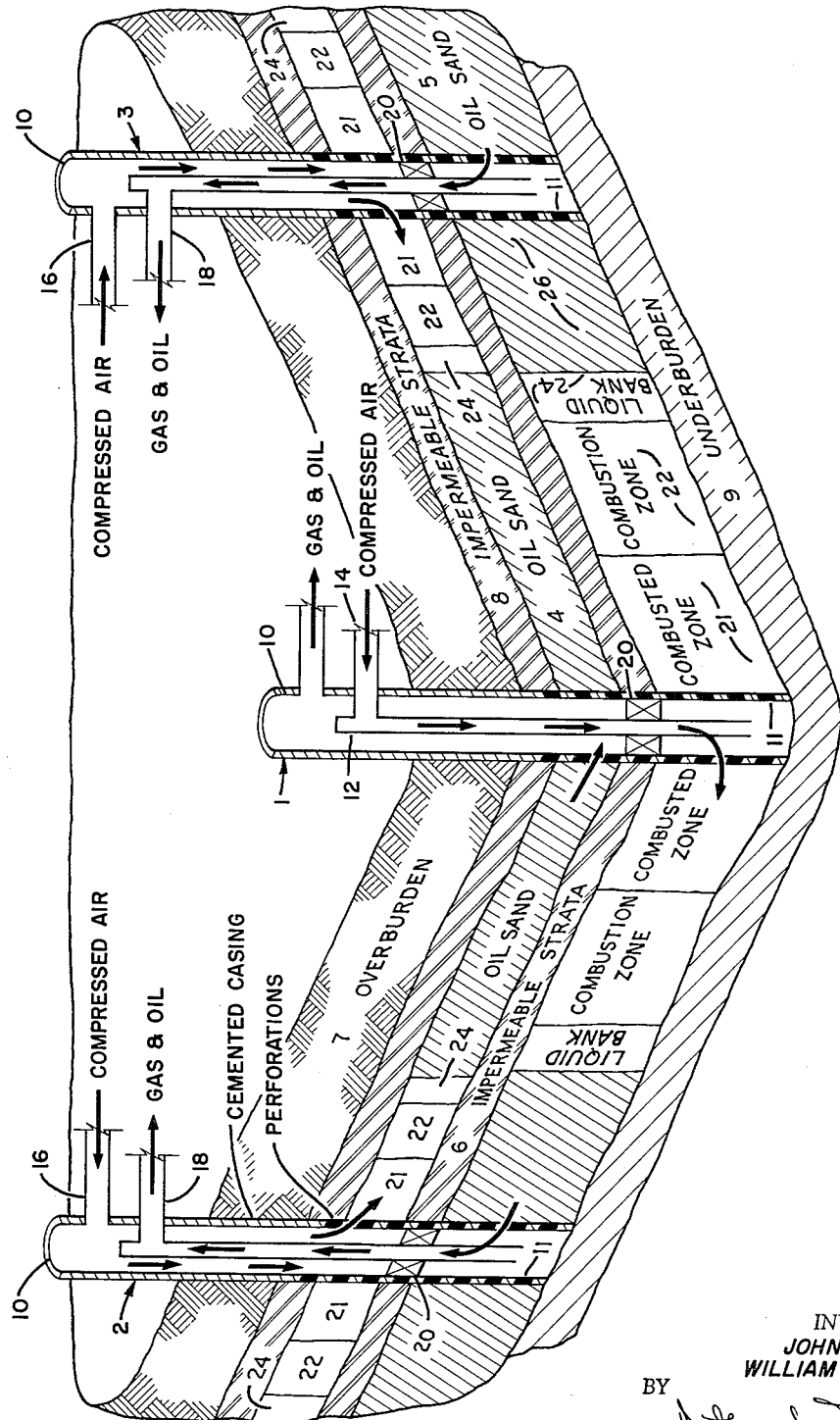
FIGURE 1 is a block diagram of the preferred arrangement of wells for practicing our method.

Referring more specifically to the drawing and especially to FIGURE 1, a plurality of wells 1, 2 and 3 traverse oil bearing sands or production zones 4 and 5, which are separated by impermeable strata 6. The wells also, of course, penetrate an overburden 7 as well as another impermeable strata 8 immediately above production zone 4. The wells 1, 2 and 3 may terminate within production zone 5 or, in the event that they penetrate the underburden 9 or other formations which may or may not contain oil below the production zone 5, the wells may be sealed from communication with such strata by utilization of packers as is well known in the art. Each well is illustrated as being provided with an outer casing 10 which is cemented to the bore of the drilled hole in the customary manner. The casing 10 extends downwardly through the juxtaposed oil bearing sands 4 and 5 and is perforated as at 11 to permit fluid flow therethrough. A tubing string 12 extends downwardly into the well bore within the casing and is open at its lower end. The tubing string 12 is provided with an inlet 14 for compressed air or oxygen containing gas which is generated by suitable equipment (not shown) on the surface. Insofar as wells 2 and 3 are concerned, each has an air inlet 16 which is connected to the casing 10 while the tubing string 12 in each of these wells is provided with an outlet 18 for the produced oil. Packers 20 are positioned between the tubing string and the casing 10 in the vicinity of the impermeable strata 6 in order to prevent communication between oil sands 4 and 5.

In accordance with our method, compressed air or gas is introduced through the tubing string 12 of well 1 and admitted to the lowermost oil bearing strata, oil sand 5. Communication between well 1 and wells 2 and 3 through oil sand 5 is established by maintaining gas pressure until a flow of gas is obtained through the tubing strings 12 of wells 2 and 3. Heat is then applied at the formation face in the form of an electric or gas heater or through combustion of a material such as charcoal in order to raise the temperature of the incoming air or oxygen containing gas to that required to initiate combustion of the hydrocarbon materials in place at the face of formation 5 in adjacency with well bore 1.

Substantially concurrently with the initiation of combustion in oil sand 5, combustion is initiated in the oil sand 4 in adjacency with wells 2 and 3 by proceeding in the same manner as set forth above with respect to well 1.

As soon as combustion is started in the formations 4 and 5, heat transfer from the area of combustion in one zone to the immediately juxtaposed area in the adjacent formation begins. Because of air flow in a direction away from the well and because of the rapid condensation of liquids immediately in advance of each of the combustion zones, the major portion of the heat resulting from combustion is transferred by conduction to the earth strata immediately above and immediately below the combustion zone. The heat which is so transferred decreases the viscosity of the oil, first in an area immediately around the well bore and successively outwardly as combustion progresses. This increases the effective radius of drainage of the production tubing of the well and rapidly increases rates of production without increasing air requirements.

Still referring to FIGURE 1, combustion has progressed radially on oil sand 5 outwardly from well 1 and in a direction towards wells 2 and 3. Similarly, in oil sand 4, combustion has progressed outwardly and radially from wells 2 and 3 towards well 1. The representation of conditions within each of these zones as a result of the in situ combustion is necessarily schematic but is nevertheless sufficiently representative for functional discussion. As combustion progresses outwardly from the well a radially extending combusted zone 21 will be found in an area about each well. This zone has been effectively depleted of all of its oil and water, nothing remaining but porous media.

Spaced outwardly annularly from, and adjacent to the combusted zone, is a combustion zone 22 in which combustion of residual oil fractions occurs to produce sufficient heat to vaporize most of the oil occurring in the sand 5 as well as to vaporize all interstitial water. The vaporized oil and water vapor condense at the trailing edge of an area or zone, referred to on the drawing by the designation liquid bank 24, in front of the combustion zone. As previously indicated, although there is heat transfer from the combustion zone through the liquid bank and into the remaining unaffected portion 26 of the oil sand and hence some decrease in viscosity of oil in the latter area with a concomitant increase in production rate, the majority of the heat of combustion is transferred vertically into immediately adjacent formations through the impermeable strata 6 and into the oil sand 4 in the area of the oil sand which has not been laterally affected by combustion therein. As combustion progresses radially from well 1, the temperature of the oil in oil sand 4 increases progressively in a radial direction so as to coincide substantially with the temperature rise in formation 5 thus decreasing the viscosity of liquids in oil sand 4 and increasing the mobility of the oil through the formation. What occurs in formation 4 as a result of combustion in formation 5 also occurs in formation 5 as a result of combustion in formation 4 in the area of wells 2 and 3. As to formation 5, well 1 is an injection well and wells 2 and 3 are production wells. Contrariwise, with respect to formation 4, wells 2 and 3 constitute injection wells and well 1 constitutes a production well.

Figure 2:
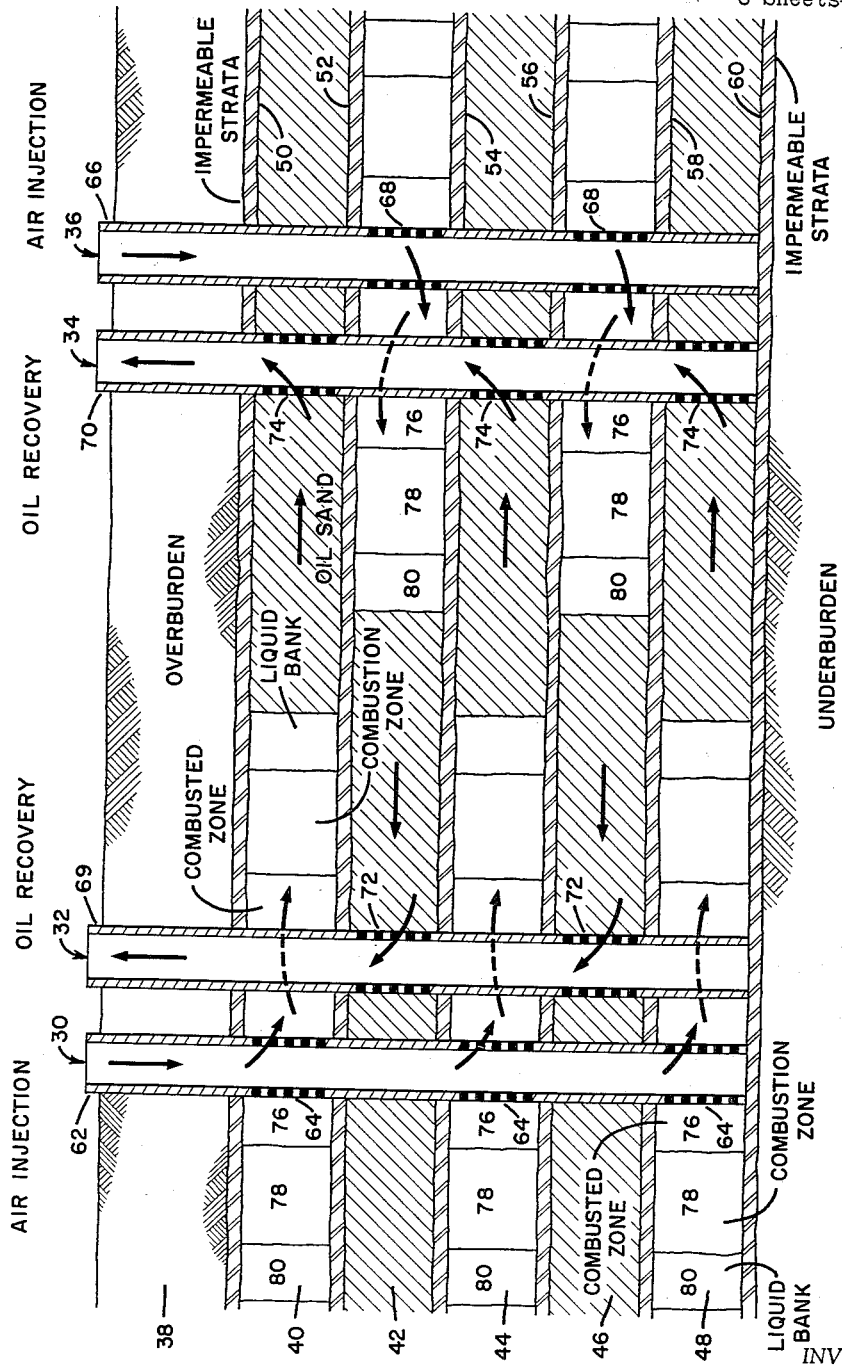
FIGURE 2 is a diagrammatic elevational view of an alternate arrangement of wells which can be utilized in practicing our process.

Although it is preferred to utilize a single well bore to accomplish both injection and production with respect to different adjacent formations, FIGURE 2 illustrates a suitable arrangement for practicing the method of our invention by employment of separate well bores for air injection and for oil recovery. For example, in FIGURE 2 the wells 30, 32, 34 and 36 penetrate a plurality of stratigraphic formations including the overburden 38, oil sands 40, 42, 44, 46 and 48 and impermeable strata 50, 52, 54, 56, 58 and 60 which form vertical permeability barriers between otherwise adjacent formations. Wells 30 and 36 constitute air injection wells as to alternatively adjacent formations, the well 30 having a casing 62 which is perforated as at 64 within formations 40, 44 and 48 while the injection well 36 has a casing 66 which is provided with perforations 68 within formations 42 and 46. The oil recovery wells 32 and 34 are each respectively adjacent to injection wells 30 and 36 and the casings of these wells 69 and 70 are similarly perforated in alternate formations. The casing 69 is perforated as at 72 within formations 42 and 46 while the casing 70 of recovery well 34 is perforated as at 74 within formations 40, 44 and 48.

As indicated with respect to the operation of the well arrangement of FIGURE 1, in situ combustion is initiated in formations 40, 44 and 48 in the area adjacent to the injection well 30 by injecting air under pressure through this well to obtain an air sweep through each of the formations to the recovery well 34. The air is heated to the combustion temperature of the hydrocarbons occurring in these formations and the resulting combustion front is propagated through such formations by continuance of air injection. As combustion progresses, each of these formations is provided with a radially expanding combusted zone 76, a combustion zone 78, and a liquid bank 80. Similar zones referred to by the same reference numerals progress radially outwardly from the injection well 36. Since the air injection wells 30 and 36 are respectively adjacent to oil recovery wells 32 and 34, the oil in each producing section of the hydrocarbon bearing formations will be heated as a result of vertical conductance of heat from the combustion zone 78 of the immediately adjacent formation or formations. Where there are a large plurality of juxtaposed formations separated by vertical permeability barriers, such as is the case in the San Miguelito Field in California, the alternate production zones adjacent to the recovery wells 32 and 34 will be vertically heated by conductance from two adjacent combustion zones.

It will be clear from a consideration of FIGURES 1 and 2 that multiple pairs or combinations of adjacent oil sands can be produced by utilization of conventional multiple completion wells in which each of a plurality of tubing strings communicate with a single oil sand. In such a case, a single well may constitute an injection well as to one or more producing zones while constituting a production well as to one or more other producing zones.

The substantially improved effectiveness of our countercurrent in situ combustion method is demonstrated in FIGURES 3 through 6 for a 21° API crude oil recovered from the North Tisdale Field in Johnson County, Wyoming.

Figure 3:
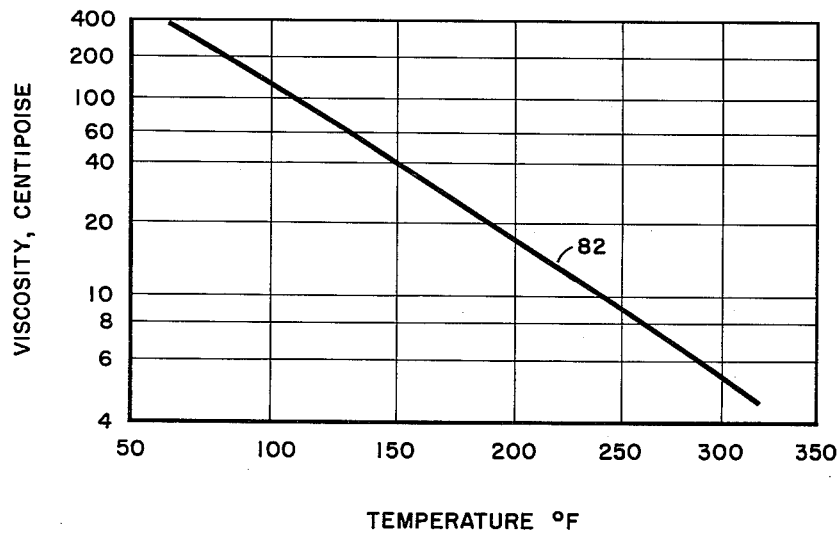
FIGURE 3 is a graph showing the viscosity in centipoises, at different temperatures, of a 21° API crude oil recovered from the North Tisdale Field in Johnson County, Wyoming.

FIGURE 3 is, as noted, a plot of the viscosity in centipoises (as ordinate) of the 21° API North Tisdale crude as a function of temperature (as abscissa). From this curve, 82, it will be seen that the viscosity of the oil at the production zone temperature of 70° F. is approximately 300 centipoises; that at 100° F. its viscosity is approximately 125 cp. while at a temperature of 150° F. viscosity is approximately 40 cp. and at a temperature of 300° F. viscosity is approximately 5.5 cp.

Figure 4:
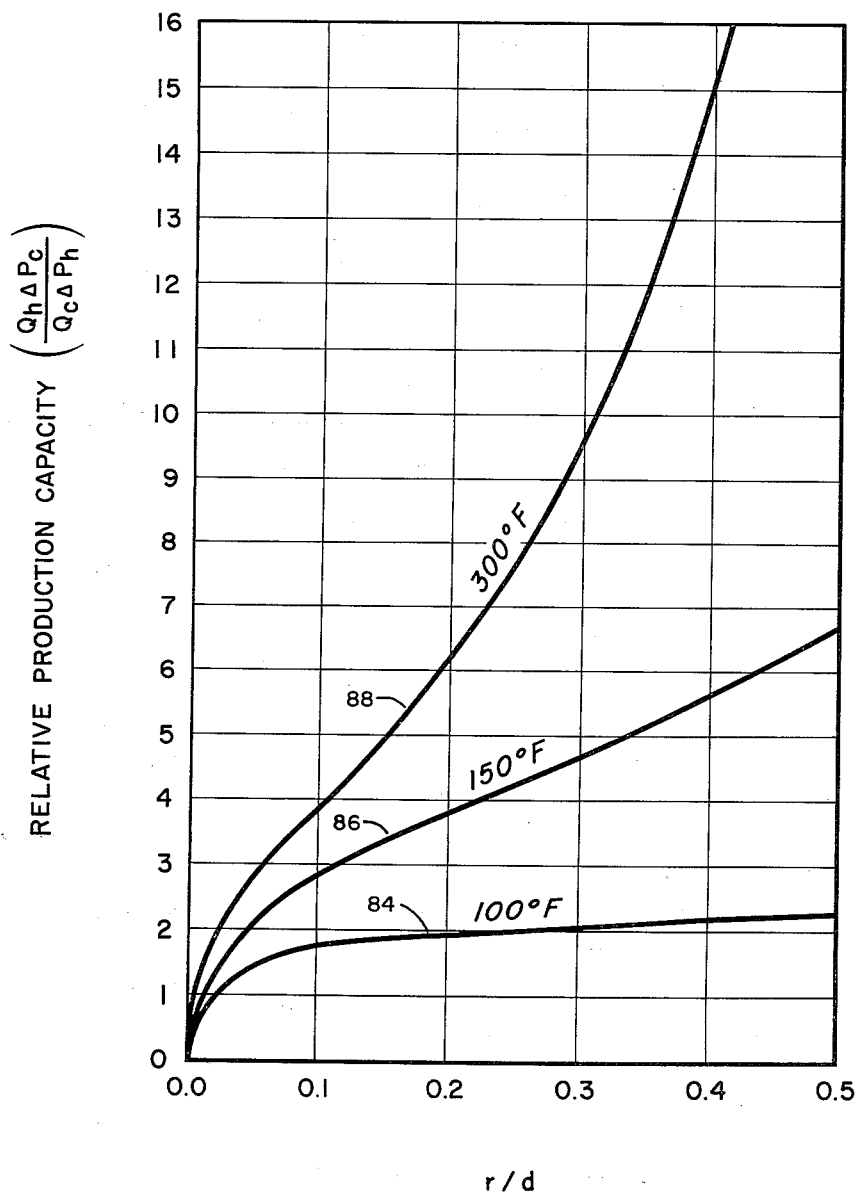
FIGURE 4 is a graph illustrating the effects of the temperature and radius of a heated zone surrounding a production well on the relative production capacity of that well with respect to another well having no heated zone.
Figure 5:
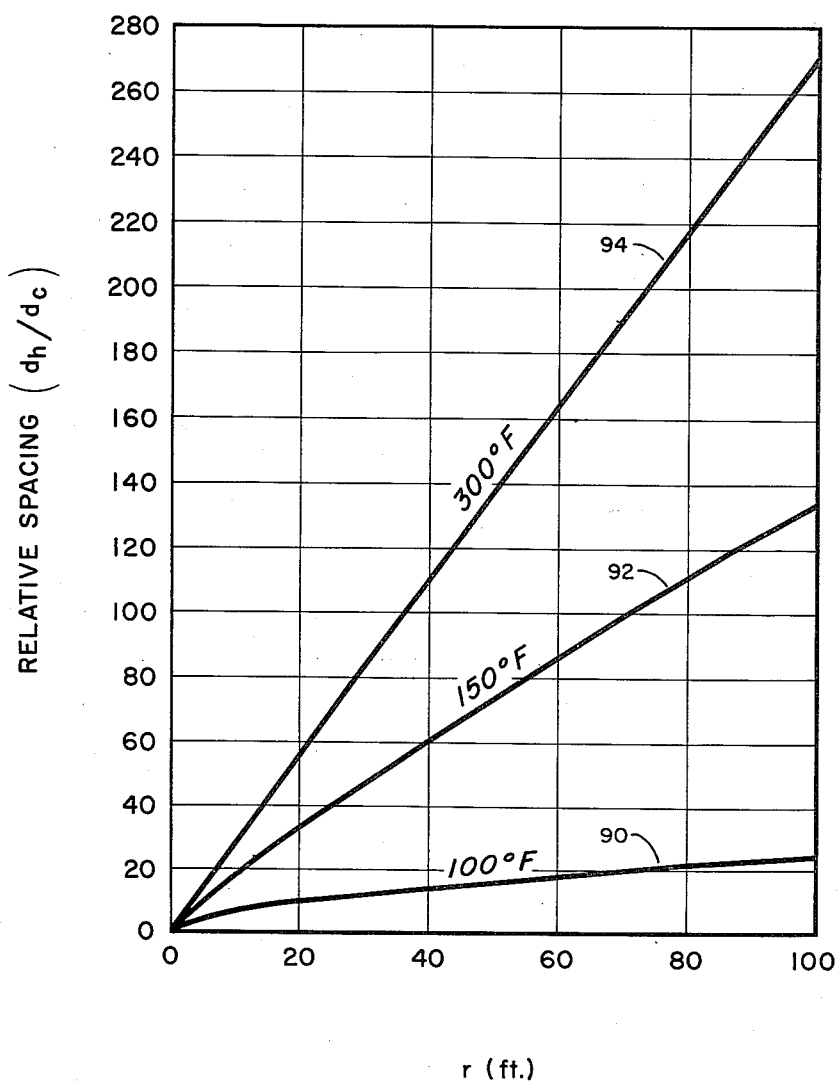
FIGURE 5 is a graph illustrating the effects of the temperature and radius of a heated zone surrounding a production well on the relative spacing between injection and production wells required to give a constant flow rate for an in situ combustion system employing the counterflow principles of our invention and for a conventional in situ combustion system.
Figure 6:
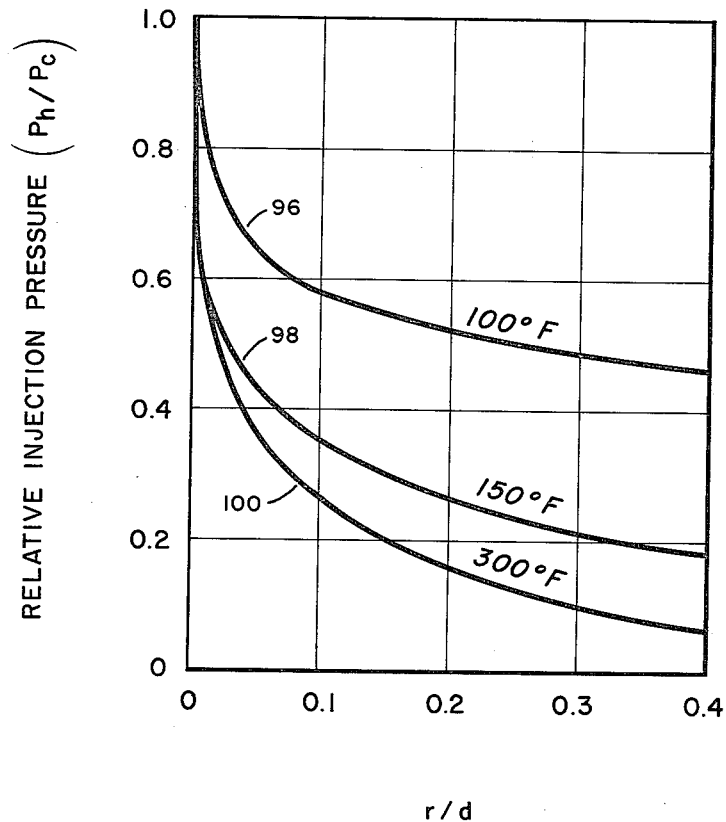
FIGURE 6 is a graph showing the effects of the temperature and radius of a heated zone surrounding a production well on the relative injection pressures required to give a constant flow rate for an in situ combustion system employing the principles of our invention and for a conventional in situ combustion system.

The graphs of FIGURES 4, 5 and 6 have been developed for a 21° API crude oil, a well bore radius of 4″ and an effective radius of drainage of an output well equal to the distance between the input and output wells in a 5-spot developed pattern divided by the factor 1.855, by utilization of the following formulas. The development of these equations from standard formulas described in chapters 4 and 9 in Muskat, The Flow of Homogeneous Fluids Through Porous Media (J. W. Edwards, Inc., 1946), will be clear to those familiar with the art.

For FIGURE 4—

$$\frac{Qh}{Qc} = \frac{u_2 \ln re/rw}{u_1 \ln r/rw + u_2 \ln re/r}$$

For FIGURE 5—

$$\frac{(re)h}{(re)c} = \left(\frac{r}{rw}\right)^{\left(1-\frac{u_1}{u_2}\right)}$$

For FIGURE 6—

$$\left(\frac{\Delta Ph}{\Delta Pc}\right) \simeq \frac{Ph}{Pc} = \left(\frac{Qc}{Qh}\right) = \frac{u_1 \ln r/rw + u_2 \ln re/r}{u_2 \ln re/rw}$$

where:
the subscript $h$ indicates the presence of a heated zone
$c$ indicates the absence of a heated zone
$u_1$ = the viscosity of oil flowing in the heated zone
$u_2$ = the viscosity of oil flowing outside the heated zone
$r$ = the radius of the heated zone, ft.
$rw$ = the radius of the well bore, ft.
$re$ = the radius of drainage of an output well which is equal to $d/1.855$ ft. in a conventional 5-spot pattern
$d$ = the distance between the input and output wells in a conventional 5-spot developed pattern
$\Delta P$ = pressure drop from $re$ to the output well.

It will be seen from FIGURE 4 that the relative production capacities of two independent wells, each one occupying the same position in a so-called 5-spot developed pattern, and one of which is heated for a percentage of the distance outwardly to an injection well while the other of which is maintained at its original reservoir temperature, increases substantially for any single temperature as the radius of the heated zone increases with respect to the distance between the production and injection wells. For example, it will be seen from curve 84 that at a temperature of 100° F., the production rate of a well which has a heated zone radius .1 the total distance between the production and the injection wells is approximately 1.8 times the production rate of a well having a relatively constant temperature of 70° F. between the production and the injection wells. Similarly, it will be seen from curve 86 that if this same zone is heated to a temperature of 150° F., the relative production rate or capacity will be 2.9 while curve 88 shows that at a temperature of 300° F. the relative production rate will be 3.9. It will also be noted that for any one of these temperatures the relative production capacity of the heated well with respect to the unheated well increases as a function of the ratio of the radius of the heated zone to the distance between the injection and the production wells. For example, for a temperature of the heated zone of 300° F. the flow rate of the heated zone well is slightly less than four times the production rate of a well not having a heated zone where the radius of the heated zone is .1 of the distance between the production and the injection wells, while where this latter radius is .4, the flow rate of the well having a heated zone is approximately 15 times that of a well not having a heated zone.

FIGURE 5 is a graph illustrating the effect of the heated zone radius and the temperature of that zone on the relative spacing required for equivalent flow rates from producing wells. Referring specifically to curve 90, heating a zone having a radius of 20 feet to a temperature of 100° F. results in a permissible spacing ten times that possible with a production well having no heated zone. The temperature and heated zone radius are even more noticeable with respect to the curves 92 and 94. Simply heating a zone 10 feet in radius to a temperature of 150° F. results in a permissive spacing between injection and production wells of 18 times that required to get the same production from a well not having a heated zone, while if this same 10-foot radius zone is heated to a temperature of 300° F., the spacing of injection and production wells can be 28 times that required to maintain the same flow rates between an injection and a production well not having a heated zone. Of course it will be immediately recognized that substantial economies in production costs can be obtained because of the ability to increase the spacing between production and injection wells without decreasing production rates.

The graph of FIGURE 6 shows the effects of the heated zone radius and its temperature on the relative injection pressure required for equivalent flow rates from production wells having a heated zone and not having a heated zone. It will be seen that each of curves 96, 98 and 100 indicate a rapid decrease in the required relative injection pressure as the ratio of the radius of the heated zone to the distance between the injection and production wells increases. Thus, in order to maintain the same production rates for two wells, a first of which has a heated zone and the other of which does not, it is only necessary to maintain an air injection pressure which is .6 that of the injection pressure required for the well not having a heated zone where the first well has a heated zone having a temperature of 100° F. and a radius which is .1 the distance between the injection and production wells. The effect of temperature and the radius of the heated zone is even more apparent with reference to curve 100. As shown by this curve, the same flow rates can be obtained from two different production wells subjected to otherwise identical conditions notwithstanding the fact that one well system requires .1 the air injection pressure required by the other well system, if the temperature of a zone having a radius equal to .3 the distance between injection and production wells is raised to a temperature of 300° F.

The foregoing graphs convincingly demonstrate the substantial advantages accruing as a result of utilization of our counterflow in situ combustion process. Our process may be employed either to increase production capacities while maintaining conventional spacing between injection and production wells and maintaining conventional injection pressures or to increase spacing or to reduce required air injection pressures while obtaining substantially the same production. It is also possible to vary two or even three of the foregoing factors to obtain greatly increased economy of operation. Increasing production rates decreases the total time required to produce a particular field, while increasing the relative spacing of injection and production wells substantially decreases the capital outlay required for wells to produce a particular field, and decreasing air injection pressures reduces operating costs and capital outlays for compressors and related equipment.

Figure 7:
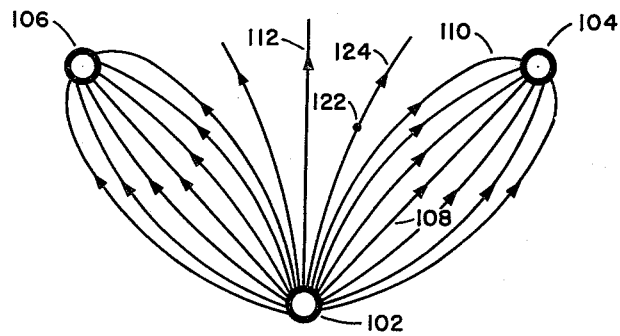
FIGURE 7 is a schematic representation of oil flow patterns between the injection well and production well of a conventional in situ combustion system.
Figure 8:
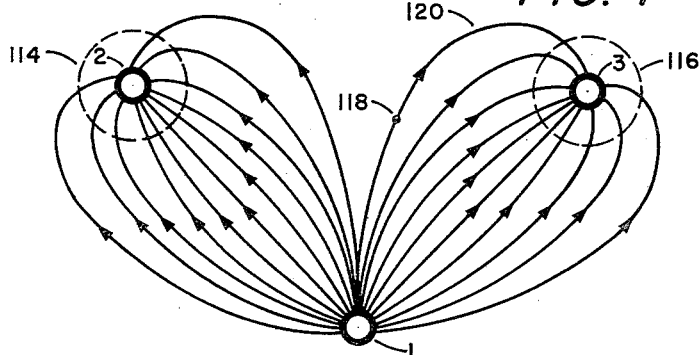
FIGURE 8 is a schematic representation of oil flow patterns between an injection well and production well of our counterflow in situ combustion process.

FIGURES 7 and 8 are further illustrative of the mechanism of our process. In FIGURE 7, where conventional in situ combustion flow patterns are schematically illustrated, crude oil flows from injection well 102 to production wells 104 and 106. It will be evident that the lines of oil flow 108 from injection well 102 to the production wells are substantially straight along the shortest paths between such wells. In an area spaced from this direct path there is some directionalization of oil flow as indicated by the flow lines 110. However, in the area midway between the production wells, flow lines 112 from the injection well 102 again tend to become radial straight lines. In short, FIGURE 7 illustrates that with conventional gas injection methods, a significant quantity of the injected gas is wasted in dispersing the crude oil throughout the formation rather than in directing it towards the producing wells. On the other hand, FIGURE 8 illustrates the directionalization effects of our counterflow in situ combustion method. Here, considering that this figure represents conditions of flow in production zone 5 of FIGURE 1, the well 1 is, as to this particular formation, an injection well while the wells 2 and 3 are, as to this formation, production wells. The mechanism of the directionalization effects of counterflow in situ combustion can be schematically illustrated by the dashed line circles 114 and 116 around production wells 2 and 3. The increased temperatures in the producing zones around these wells, resulting from heat conductance from combustion in the adjacent strata, results in substantially reduced viscosity of the oil in situ and increased mobility of the strata to the flow of oil and gas. The effects of decreased oil viscosity and substantially increased gas and oil mobility are substantially the same as if the diameter of the well bores of wells 2 and 3 were substantially increased. Thus the dashed circles 114 and 116 may be considered to represent the effective well bore of wells 2 and 3 resulting from our counterflow in situ combustion. It will be clear that the direction of flow of oil at a point 118 will be as indicated by the oil flow line 120 which results in production of oil from this point whereas the direction of flow of oil occurring at a point 122 (in FIGURE 7) will be as indicated by line 124 and will not be produced by the corresponding production well 104.

Having fully described the details of our process and its advantages, we claim:

1. A method of producing hydrocarbons from two vertically-spaced adjacent hydrocarbon-bearing zones within a reservoir separated by a substantially impermeable barrier which comprises drilling two spaced-apart well bores into said reservoir whereby said zones are traversed, injecting combustion-supporting gas through a first of said well bores into the first of said zones, injecting combustion-supporting gas through the second of said well bores into the second of said zones, initiating in situ combustion in said first zone in the vicinity of said first well bore and in said second zone in the vicinity of said second well bore, maintaining the flow of said combustion-supporting gas thereby propagating combustion in each of said zones counterflow to the direction of combustion in the adjacent zone, producing the hydrocarbons of said second zone through said first well bore, and producing the hydrocarbons of said first zone through said second well bore.

2. A method of producing hydrocarbons from two vertically-spaced adjacent hydrocarbon-bearing zones within a reservoir separated by a substantially impermeable barrier which comprises drilling three spaced-apart well bores into said reservoir whereby said zones are traversed, injecting combustion-supporting gas through a first of said well bores into the first of said zones, injecting combustion-supporting gas through the second and third of said well bores into the second of said zones, initiating in situ combustion in said first zone in the vicinity of said first well bore and in said second zone in the vicinity of said second and third well bores, maintaining the flow of said combustion-supporting gas thereby propagating combustion in each of said zones counterflow to the direction of combustion in the adjacent zone, producing the hydrocarbons of said second zone from said first well bore and producing the hydrocarbons of said first zone from said second and third well bores.

3. A method of producing hydrocarbons from three, an upper, intermediate and lower zone, vertically-spaced adjacent hydrocarbon-bearing zones within a reservoir separated by substantially impermeable barriers which comprises drilling two spaced-apart well bores into said reservoir whereby said zones are traversed, injecting combustion-supporting gas through a first of said well bores into the intermediate of said zones, injecting combustion-supporting gas through the second of said well bores into the upper and lower of said zones, initiating in situ combustion in said intermediate zone in the vicinity of said first well bore and in said upper and lower zones in the vicinity of said second well bore, maintaining the flow of said combustion-supporting gas thereby propagating combustion in each of said zones counterflow to the direction of combustion in the adjacent zones, producing the hydrocarbons of the upper and lower zones through said first well bore, and producing the hydrocarbons of the intermediate zone through said second well bore.

4. A method of producing hydrocarbons from three, an upper, intermediate and lower zone, vertically-spaced adjacent hydrocarbon-bearing zones within a reservoir separated by substantially impermeable barriers which comprises drilling three spaced-apart well bores into said reservoir whereby said zones are traversed, injecting combustion-supporting gas through a first of said well bores into the intermediate of said zones, injecting combustion-supporting gas through the second and third of said well bores into the upper and lower of said zones, initiating in situ combustion in said intermediate zone in the vicinity of said first well bore and in said upper and lower zones in the vicinity of said second and third well bores, maintaining the flow of said combustion-supporting gas thereby propagating combustion in each of said zones counterflow to the direction of combustion in the adjacent zones, producing the hydrocarbons of said intermediate zone from said second and third well bores, and producing the hydrocarbons of said upper and lower zones from said first well bore.

References Cited in the file of this patent

UNITED STATES PATENTS

| | | |
|---|---|---|
| 2,217,749 | Hewitt | Oct. 15, 1940 |
| 2,238,701 | McCollum | Apr. 15, 1941 |
| 2,561,639 | Squires | July 24, 1951 |
| 2,584,605 | Merriam et al. | Feb. 5, 1952 |
| 2,642,943 | Smith | June 23, 1953 |
| 2,734,579 | Elkins | Feb. 14, 1956 |
| 2,736,381 | Allen | Feb. 28, 1956 |
| 2,793,696 | Morse | May 28, 1957 |

UNITED STATES PATENT OFFICE
CERTIFICATE OF CORRECTION

Patent No. 3,054,448                                   September 18, 1962

John N. Dew et al.

It is hereby certified that error appears in the above numbered patent requiring correction and that the said Letters Patent should read as corrected below.

Column 2, line 28, for "walls" read -- wells --; column 3, line 55, for "on" read -- in --.

Signed and sealed this 2nd day of April 1963.

(SEAL)
Attest:

ESTON G. JOHNSON                                    DAVID L. LADD

Attesting Officer                                        Commissioner of Patents